United States Patent
Ko et al.

(10) Patent No.: US 9,780,609 B2
(45) Date of Patent: Oct. 3, 2017

(54) SUPERCONDUCTING SYNCHRONOUS MOTOR

(71) Applicant: Industry-Academic Cooperation Foundation, Yonsei University, Seoul (KR)

(72) Inventors: Tae Kuk Ko, Seoul (KR); Young Jin Hwang, Incheon (KR); Jin Bae Na, Seoul (KR); Sukjin Choi, Seoul (KR); Hyun Chul Jo, Seoul (KR); Jae Young Jang, Incheon (KR); Hyung Jun Kim, Jeonju-si (KR); Jiho Lee, Guri-si (KR)

(73) Assignee: INDUSTRY-ACADEMIC COOPERATION FOUNDATION, YONSEI UNIVERSITY (KR)

( * ) Notice: Subject to any disclaimer, the term of this patent is extended or adjusted under 35 U.S.C. 154(b) by 419 days.

(21) Appl. No.: 14/401,327

(22) PCT Filed: Mar. 28, 2013

(86) PCT No.: PCT/KR2013/002591
§ 371 (c)(1),
(2) Date: Nov. 14, 2014

(87) PCT Pub. No.: WO2013/172546
PCT Pub. Date: Nov. 21, 2013

(65) Prior Publication Data
US 2015/0130303 A1    May 14, 2015

(30) Foreign Application Priority Data
May 14, 2012  (KR) .......................... 10-2012-0051006

(51) Int. Cl.
*H02K 1/24*    (2006.01)
*H02K 55/02*   (2006.01)
(Continued)

(52) U.S. Cl.
CPC ............... *H02K 1/243* (2013.01); *H02K 3/18* (2013.01); *H02K 3/528* (2013.01); *H02K 9/20* (2013.01); *H02K 55/02* (2013.01)

(58) Field of Classification Search
CPC .......... H02K 1/243; H02K 3/18; H02K 3/528; H02K 9/20; H02K 55/02
(Continued)

(56) References Cited

U.S. PATENT DOCUMENTS

2003/0094880 A1*  5/2003  Hsu ........................ H02K 21/38
                                                          310/266

FOREIGN PATENT DOCUMENTS

JP      06-077047       3/1994
JP      2005269868      9/2005
(Continued)

OTHER PUBLICATIONS

Machine translation of JP 2010028904 A (Feb. 2010).*
(Continued)

*Primary Examiner* — Michael Andrews
(74) *Attorney, Agent, or Firm* — Onello & Mello, LLP

(57) ABSTRACT

A superconducting synchronous motor having a simple and stable structure is provided. The superconducting synchronous motor according to one embodiment of the present invention comprises: a rotary shaft; a rotation core mounted at the rotary shaft so as to be rotated by connecting with the rotary shaft; and hooked magnetic poles extending from one end of the rotation core in a longitudinal direction. Each of the hooked magnetic poles is composed of first and second inductors of a magnetic material alternately engaged with each other and a superconducting wire to be wound, and comprises a first superconducting field winding and a second superconducting field winding fixed closely at the other end of a first inductor rotation core and the other end of a second
(Continued)

inductor rotation core, respectively. Each of the first superconducting field winding and the second superconducting field winding excites the first inductor and the second inductor to different poles.

5 Claims, 5 Drawing Sheets

(51) Int. Cl.
  *H02K 3/18* (2006.01)
  *H02K 3/52* (2006.01)
  *H02K 9/20* (2006.01)
(58) Field of Classification Search
  USPC .................................... 310/54, 156.66, 263
  See application file for complete search history.

(56) References Cited

FOREIGN PATENT DOCUMENTS

| | | | |
|---|---|---|---|
| JP | 2007037343 | 2/2007 | |
| JP | 2007060744 | 3/2007 | |
| JP | 2010028904 | 2/2010 | |
| JP | 2010028904 A * | 2/2010 | ............. H02K 55/02 |

OTHER PUBLICATIONS

Office Action from Korean Application No. 10-2012-0051006 dated May 8, 2013.
International Search Report from PCT application PCT/KR2013/002591 dated Jul. 12, 2013.

* cited by examiner

SUPERCONDUCTING SYNCHRONOUS MOTOR

TECHNICAL FIELD

The invention relates to a superconducting synchronous motor, and more particularly, to a superconducting synchronous motor that can be driven with simpler structures of an exciter and a cooler than a typical synchronous motor with superconducting field windings.

BACKGROUND ART

A synchronous motor with superconducting windings, which are coils with superconducting wires wound therearound, can generate a strong magnetic field without the need to use an iron core therein, and can thus provide as large an output as a synchronous motor with no such superconducting windings, even when miniaturized. In order for superconducting windings to maintain its superconducting state, the superconducting wires need to be continuously cooled. For this, a synchronous motor needs to be provided not only with a wiring device for supplying a current to superconducting windings, but also with various devices for cooling the superconducting windings, and requires special design, and manufacturing processes that are based on cryogenic technology.

Since superconducting windings generally generate a direct current (DC) magnetic field, superconducting windings may be used in synchronous motors as field windings, and copper windings may be used as armature windings for generating an alternating current (AC) magnetic field. In a synchronous motor in which tri-phase AC power is supplied to an armature windings, an armature winding is provided as part of a stator for the reason of supplying a current and for other various structural reasons. Accordingly, in a related-art synchronous motor, a superconducting field winding is generally configured as being part of a rotor.

However, in the related-art superconducting synchronous motor, the superconducting field winding is rotated along with the rotor. As a result, not only the structure of an exciter for applying a current to the superconducting field winding, but also the structure of a cooler for constantly cooling the superconducting field winding, may become complicated, thereby making it difficult to properly control the related-art superconducting synchronous motor and causing frequent breakdowns of the related-art superconducting synchronous motor.

DISCLOSURE

Technical Problems

Exemplary embodiments of the invention provide a superconducting synchronous motor, which is a synchronous motor using a tri-phase alternating current (AC) power supply and having a structure in that superconducting field windings are configured to be part of a stator so as not to be rotated during the operation of the synchronous motor.

However, exemplary embodiments of the invention are not restricted to those set forth herein. The above and other exemplary embodiments of the invention will become more apparent to one of ordinary skill in the art to which the invention pertains by referencing the detailed description of the invention given below.

Technical Solutions

According to an exemplary embodiment of the invention, a superconducting synchronous motor includes: a rotary shaft; first and second inductors, each of the first and second inductors including a rotation core mounted at the rotary shaft so as to be rotatable along with the rotary shaft and a hooked magnetic pole extended from a first end of the rotation core in a longitudinal direction, wherein the first and second inductors are formed of a magnetic material and are coupled to each other in such a manner that the hooked magnetic poles of the first and second inductors are alternately engaged with each other; and first and second superconducting field windings configured to be formed of superconducting wires and to be installed, and fixed, near second ends of the rotation cores of the first and second inductors, respectively, wherein the first and second superconducting field windings excite the first and second inductors, respectively, to different poles.

Advantageous Effects

According to the exemplary embodiments of the invention, since superconducting field windings are not rotated during the rotation of a superconducting synchronous motor, it is possible to simplify the structures of an exciter for supplying a current to the superconducting field windings and a cooler for maintaining the superconducting field windings at cryogenic temperature. Also, since the superconducting field windings are located on the outside of an inductor assembly, it is possible to facilitate the design of wiring from an exciter to the superconducting field windings. Also, since the hooked magnetic poles of first and second inductors, which form a homopolar inductor assembly and can be excited to different poles, extend to be as long as a stator, it is possible to increase the overlapping area of an armature winding and the first and second inductors, which are alternately arranged, and thus to effectively generate a magnetic field in the form of a sine curve between the armature winding and the first and second inductors. As a result, it is possible to improve the efficiency of a synchronous motor.

Other features and exemplary embodiments will be apparent from the following detailed description, the drawings, and the claims.

MODE FOR INVENTION

Figure 1:
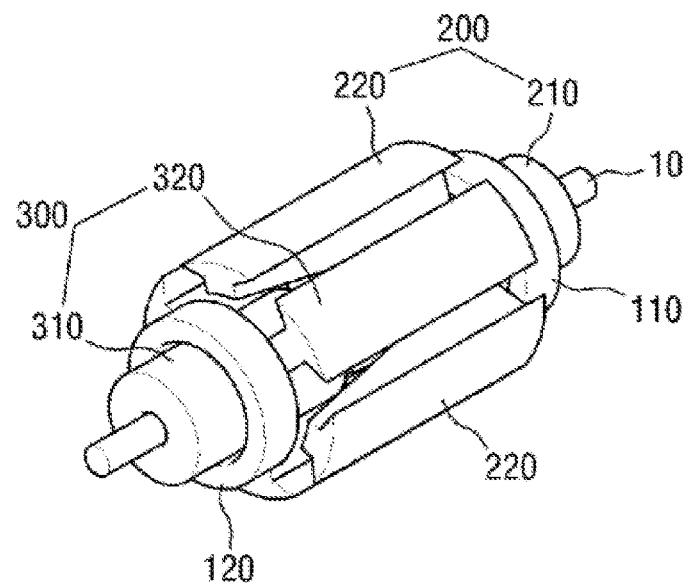
FIGS. 1 and 2 are an assembled perspective view and an exploded perspective view, respectively, of a superconducting synchronous motor according to an exemplary embodiment of the invention.

Advantages and features of the invention and methods of accomplishing the same may be understood more readily by reference to the following detailed description of exemplary embodiments and the accompanying drawings. The invention may, however, be embodied in many different provides and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

Unless indicated otherwise, it is to be understood that all the terms used in the specification including technical and scientific terms have the same meanings as those as understood by a person skilled in the art. It should be understood that the terms defined by a dictionary must be identical with the meanings within the context of the related art, and they should not be ideally or excessively formally defined unless the context clearly dictates otherwise.

The structure and operation of a superconducting synchronous motor according to an exemplary embodiment of the invention will hereinafter be described with reference to FIGS. 1 to 3.

Figure 2:
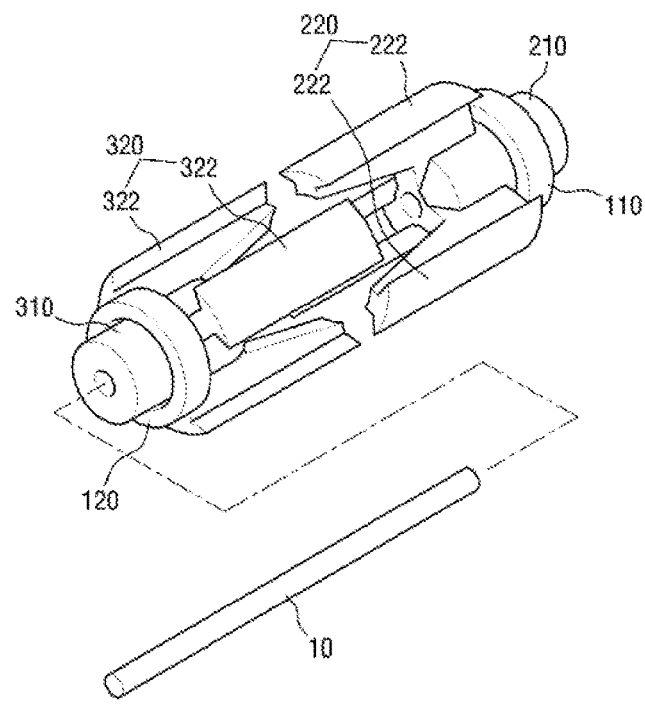

Referring to FIGS. 1 and 2, a superconducting synchronous motor according to an exemplary embodiment of the invention includes a rotary shaft 10, a first inductor 200, a second inductor 300, a first superconducting field winding 110, and a second superconducting field winding 120.

The rotary shaft 10 may serve as an axis about which to rotate a rotor of the superconducting synchronous motor. In an exemplary embodiment, the rotary shaft 10 and the first and second inductors 200 and 300, which are fixed to the rotary shaft 10 and can thus be rotated along with the rotary shaft 10, may constitute the rotor together. In response to a magnetic pole of a stator 400, which is formed to surround the rotor, being rotated at a uniform speed by an armature winding connected to a tri-phase alternating current (AC) power supply, the rotor may rotate at a synchronous speed with respect to the number of poles and the operating frequency of the superconducting synchronous motor.

As mentioned above, the first and second inductors 200 and 300 may form the rotor of the superconducting synchronous motor. The first and second inductors 200 and 300 may include rotation cores 210 and 310, respectively, and hooked magnetic poles 220 and 320, respectively.

As illustrated in FIGS. 1 and 2, the rotation cores 210 and 310 may be mounted at the rotary shaft 10 so as to be rotatable along with the rotary shaft 10. In an exemplary embodiment, the rotation cores 210 and 310 may be formed as cylinders so as not to interfere with other neighboring elements, for example, the first and second superconducting field windings 110 and 120, during the rotation of the first inductor 200 and the second inductor 300.

The hooked magnetic poles 220 and 320 may extend from first ends of the rotation cores 210 and 310, respectively, and the first and second inductors 200 and 300 may be coupled to each other in such a manner that the hooked magnetic pole 220 of the first inductor 200 and the hooked magnetic pole 320 of the second inductor 300 can be alternately engaged with each other. The first and second superconducting field windings 110 and 120 are provided at second ends of the rotation cores 210 and 310, respectively, where the hooked magnetic poles 220 and 320 are not connected. The first and second inductors 200 and 300 are excited to different poles by the first and second superconducting field windings 110 and 120, respectively, around the rotation cores 210 and 310, respectively. In an exemplary embodiment, as illustrated in FIG. 2, the hooked magnetic poles 220 and 320 of the first and second inductors 200 and 300 may include three-pronged forks 222 and 322, respectively. The three-pronged forks 222 and 322 may protrude from the rotation cores 210 and 310, respectively, in a radial direction and extend in a longitudinal direction to have a predetermined cross-sectional shape.

The forks 222 and 322 of the first and second inductors 200 and 300 may be alternately engaged with each other while adjusting the distance between the rotation cores 210 and 310 such that the tips of the prongs of the fork 222 of the first inductor 100 can be aligned with parts where the prongs of the fork 322 of the second inductor 300 begin, as illustrated in FIG. 1. Accordingly, referring to FIG. 2 and FIG. 3, the forks 222 and 322 of the first and second inductors 200 and 300 may completely cover the rotation core 210 of the first inductor 200 and the space between the rotation cores 210 and 310 of the first and second inductors 100 and 200, and as a result, only one of the forks 222 and 322 of the first and second inductors 200 and 300 may be disposed in the space between the rotation cores 210 and 310 of the first and second inductors 100 and 200.

In this manner, a homopolar inductor assembly can be effectively implemented in which parts of the first and second inductors 100 and 200 that are excited to different poles are alternately arranged along a radial direction of the rotary shaft 10 and no heteropolar magnetic fields are generated along a longitudinal direction of the rotary shaft 10. Accordingly, the overlapping area, in the longitudinal direction, of the stator 400, which is formed to surround the forks 222 and 322 of the first and second inductors 200 and 300, and the homopolar inductor assembly may be increased. As a result, a magnetic field whose magnitude varies periodically may be effectively generated along a radial direction of the air gap between the stator 400 and the homopolar inductor assembly, and the operating efficiency of a synchronous motor may be improved.

Each of the first and second superconducting field windings 110 and 120 may be formed by winding a tape-shaped superconducting wire into the shape of a coil. In an exemplary embodiment, the first and second superconducting field windings 110 and 120 may be circular ring-shaped. The superconducting synchronous motor may include the first and second superconducting field windings 110 and 120, and the first and second superconducting field windings 110 and 120 may be installed and fixed near the second ends of the rotation cores 210 and 310, respectively, of the first and second inductors 200 and 300, as illustrated in FIGS. 1 and 2.

In an exemplary embodiment, the first and second superconducting field windings 110 and 120, which are ring-shaped, may be fixed, and installed, in the superconducting synchronous motor, and the first and second inductors 200 and 300 may be arranged in such a manner that the rotation cores 210 and 310 of the first and second inductors 200 and 300 can pass through the centers of the first and second superconducting field windings 110 and 120, respectively. A direct current (DC) power may be applied to the first and second superconducting field windings 110 and 120, and a current that flows in each of the first and second superconducting field windings 110 and 120 due to the DC power may generate a magnetic field. The magnetic field generated in each of the first and second superconducting field windings 110 and 120 excites the first and second inductors 200 and 300, which pass through the centers of the first and second superconducting field windings 110 and 120, respectively. More specifically, one of the first and second superconducting field windings 110 and 120 excites its corresponding inductor to the N pole, and the other superconducting field winding excites its corresponding inductor to the S pole.

As mentioned above, the second ends of the rotation cores 210 and 310 may correspond to the opposite sides of the parts of the first and second inductors 200 and 300 where the hooked magnetic poles 220 and 320 begin to extend. The first and second superconducting field windings 110 and 120 may be disposed at both ends of an inductor assembly obtained by coupling the first and second inductors 200 and 300 to each other in such a manner that the hooked magnetic poles 220 and 320 can be engaged with each other.

The first and second superconducting field windings 110 and 120 are disposed at both ends of the inductor assembly consisting of the first and second inductors 200 and 300, and are not rotated along with the first and second inductors 200 and 300. Accordingly, since superconducting field windings are located at both ends of an inductor assembly, the design of wiring from an exciter to the superconducting field windings may be facilitated. Also, since superconducting field windings can be formed in a circular ring shape, rather than an elliptical ring shape as in the related art, field windings can be fabricated by applying high tensile force to superconducting wires. Also, various problems of the superconducting field windings of a related-art superconducting synchronous motor being rotated along with a rotor can be addressed. For example, the structure of an exciter for supplying power to each superconducting field winding can be simplified, and the structure of a cooler for maintaining each superconducting field winding at cryogenic temperature can also be simplified.

Figure 3:
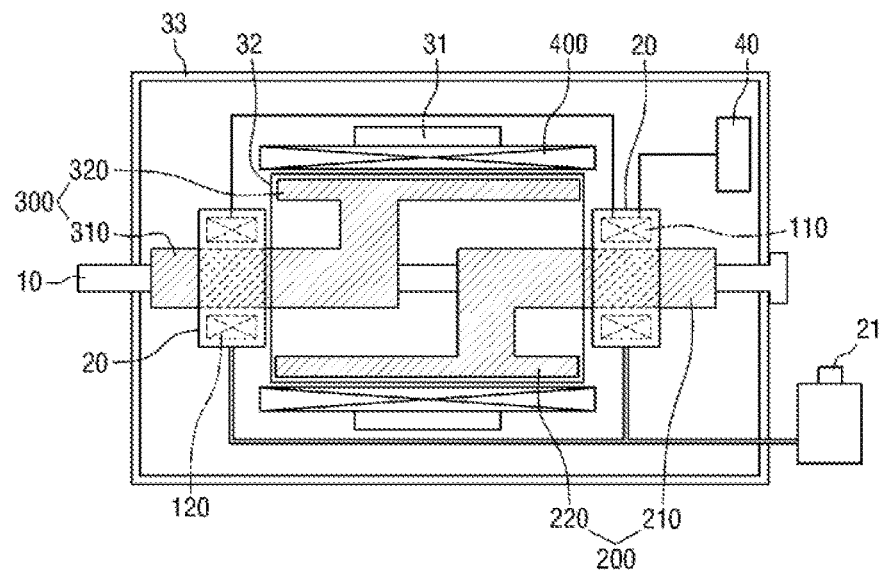
FIG. 3 is a side cross-sectional view of a superconducting synchronous motor according to another exemplary embodiment of the invention.

As illustrated in FIG. 3, the superconducting synchronous motor may also include a plurality of coolant tubs 20, which contain a cryogenic coolant therein, surround the first and second superconducting field windings 110 and 120, and are connected to a cooler 21. As mentioned above, since the first and second superconducting field windings 110 and 120 remain fixed during the operation of the superconducting synchronous motor, the superconductivity of the first and second superconducting field windings 110 and 120 can be maintained simply with the use of the coolant tubs 20, which contain a coolant therein and have a simple structure in that they surround the first and second superconducting field windings 110 and 120, respectively.

As illustrated in FIG. 3, the superconducting synchronous motor may also include an exciter 40, the stator 400 in which an armature winding is provided, and a stator yoke 31, a damper 320 and a housing 33.

The structure and operation of a stator 400 included in a superconducting synchronous motor according to another exemplary embodiment of the invention will hereinafter be described with reference to FIGS. 4 and 5B.

The superconducting synchronous motor according to another exemplary embodiment of the invention may include a stator 400, which surrounds first and second inductors 200 and 300 and is formed of a magnetic material that can be excited by an armature winding (not illustrated). Referring to FIG. 4, the stator 400 may include a plurality of consecutive slot grooves 410, which are formed on the inside of the stator 400 along a longitudinal direction.

The stator 400 may be formed of a magnetic material and may thus become a path of magnetic flux that is generated in response to a current flowing into the armature winding in the stator 400. Tri-phase AC power may be supplied to the armature winding. In an exemplary embodiment, the stator 400 may be formed as a cylinder, the length of which is the same as or smaller than the length of forks 222 and 322 of the first and second inductors 200 and 300. In this exemplary embodiment, an entire area defined along the longitudinal direction of the stator 400 may face the fork 222 or 322 of the first or second inductor 200 or 300, and as a result, a strong alternating homopolar magnetic field in the radial direction of the stator 400 may be transmitted to the stator 400. Accordingly, the efficiency of the superconducting synchronous motor may be improved.

Figure 4:
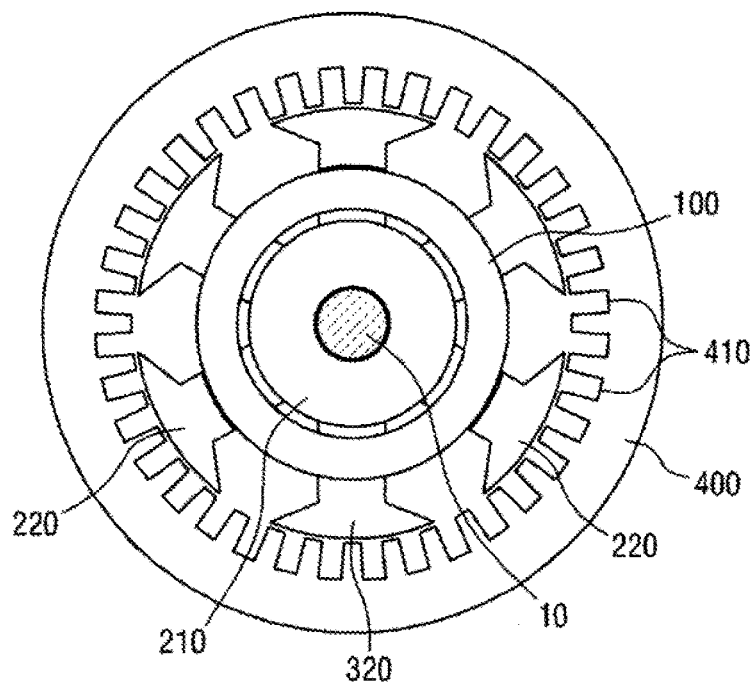
FIG. 4 is a front view of a superconducting synchronous motor according to another exemplary embodiment of the invention, which includes a stator with a plurality of slot grooves.

As illustrated in FIG. 4, in response to the slot grooves 410 being continuously arranged on the inside of the stator 400 along the radial direction of the stator 400, a magnetic field generated in the air gap between the stator 400 and an inductor assembly consisting of the first and second inductors 200 and 300 may be concentrated at the top of part of the stator 400 where the slot grooves 410 are not formed, i.e., protrusions on the inside of the stator 400. As a result, referring to FIG. 5, even within an area on the stator 400 facing a single fork, i.e., one of the forks 222 and 322 of the first and second inductors 200 and 300, there may be variations in the magnitude of a magnetic field between part of the stator 400 where the slot grooves 410 are formed and part of the stator 400 where the slot grooves 410 are not formed.

Accordingly, the magnitude of a magnetic field generated in the air gap between the stator 400 and the inductor assembly consisting of the first and second inductors 200 and 300 may vary primarily with a relatively large amplitude because the forks 222 and 322 of the first and second inductors 200 and 300 alternately appear along the radial direction of the stator 400, and may vary secondarily with a relatively small amplitude because the size of the air gap between the stator 400 and the inductor assembly consisting of the first and second inductors 200 and 300 varies due to the presence of the slot grooves 410, which are continuously arranged on the inside of the stator 400 along the radial direction of the stator 400.

Figure 5:
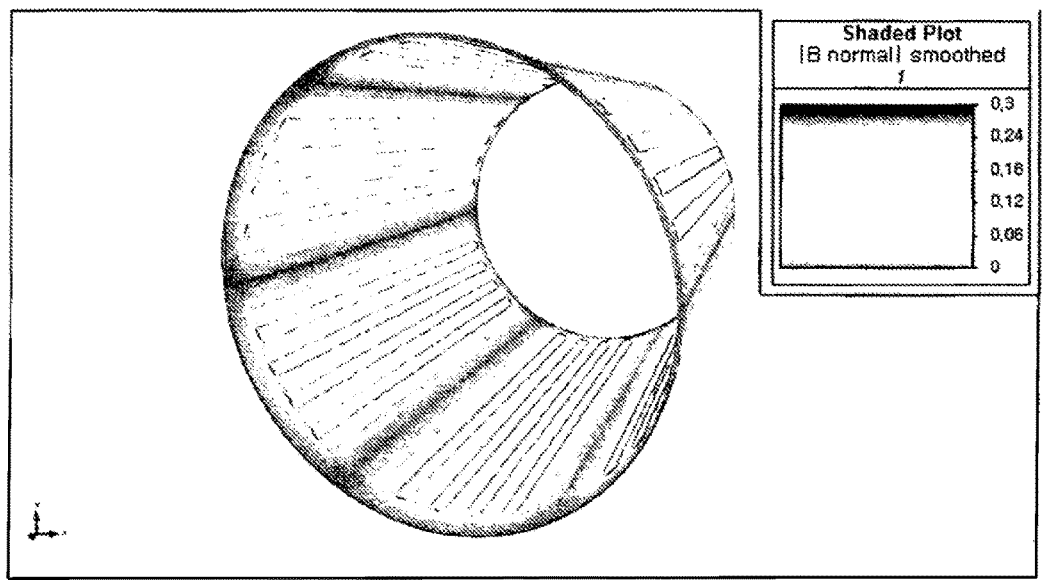
FIGS. 5 and 6 are diagrams illustrating simulation results of the magnitude of a magnetic field that may be generated in the air gap between the stator and an inductor assembly of the superconducting synchronous motor of FIG. 4.
Figure 6:
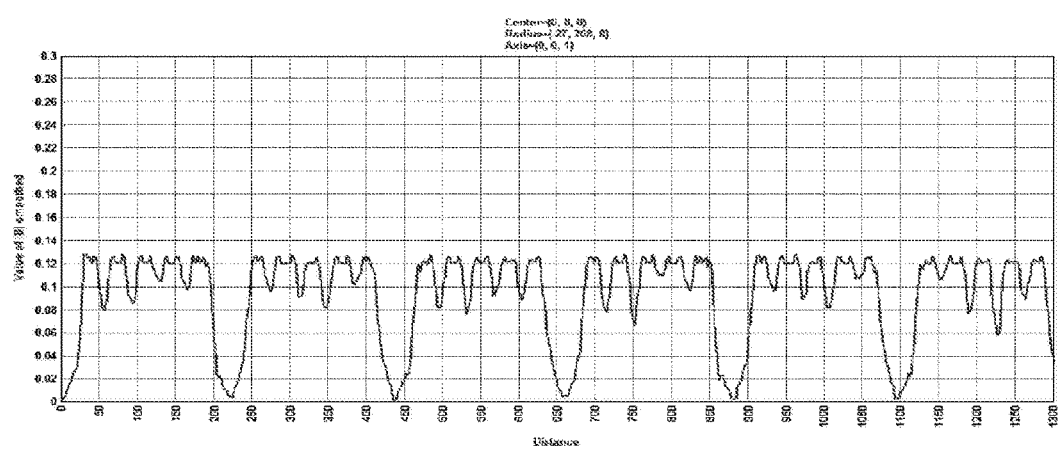

Therefore, the magnitude of the magnetic field generated in the air gap between the stator 400 and the inductor assembly consisting of the first and second inductors 200 and 300 may vary along the radial direction of the stator 400 in the form of a "double sine" curve, as illustrated in FIG. 5. The superconducting synchronous motor may generate a magnetic field whose magnitude continuous to vary, between a rotor (i.e., a rotary shaft 10 and the first and second inductors 200 and 300) and the stator 400 thereof, and may thus be efficiently driven.

The structure and operation of a superconducting synchronous motor according to yet another exemplary embodiment of the invention will hereinafter be described with reference to FIGS. 7 to 9.

Figure 7:
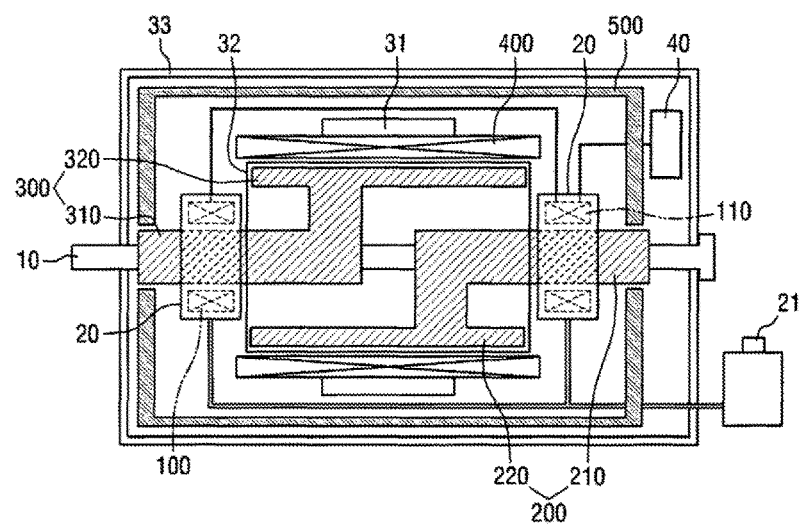
FIG. 7 is a side cross-sectional view of a superconducting synchronous motor according to another exemplary embodiment of the invention, which includes a magnetic link member.
Figure 8:
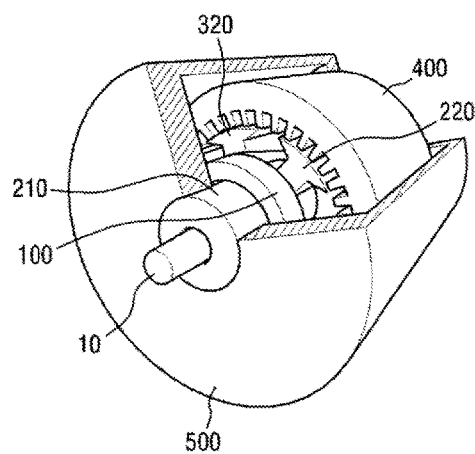
FIG. 8 is a perspective view of the superconducting synchronous motor of FIG. 7.
Figure 9:
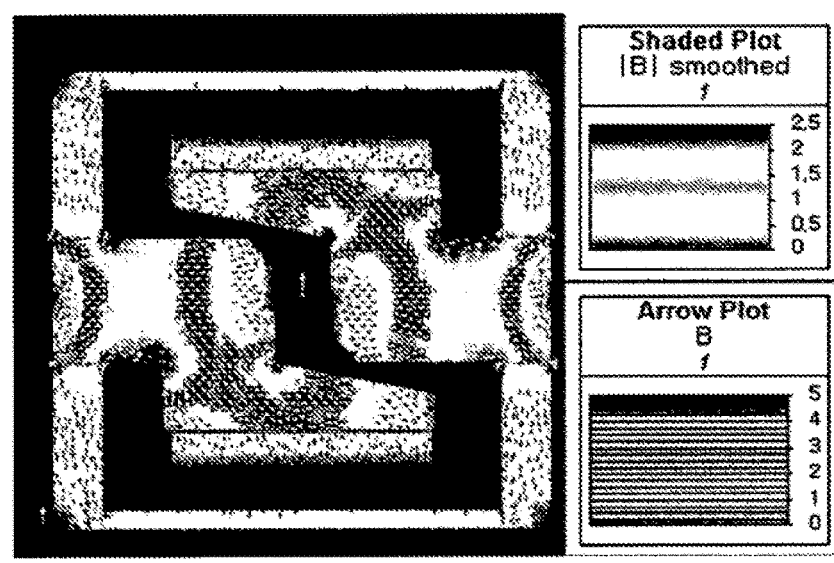
FIG. 9 is a diagram illustrating simulation results of the magnitude of a magnetic field that may be generated in a first inductor, a second inductor and the magnetic flux link member, respectively, of the superconducting synchronous motor of FIG. 7.

Referring to FIGS. 7 and 8, the superconducting synchronous motor according to yet another exemplary embodiment of the invention may include a magnetic flux link member 500, which transmits magnetic flux between first and second inductors 200 and 300 and is formed of a magnetic material. The magnetic flux link member 500 may surround first and second superconducting field windings 110 and 120 and the first and second inductors 200 and 300. The magnetic flux link member 500 may be connected to the first inductor 200 on one side thereof, and may be connected to the second inductor 300 on the other side thereof.

As illustrated in FIG. 7, in response to the first and second inductors 200 and 300 being excited to different poles by the first and second superconducting field windings 110 and 120, respectively, the direction of magnetic flux in the first inductor 200 may be opposite to the direction of magnetic flux in the second inductor 300. Due to the presence of the magnetic flux link member 500, which connects the first and second inductors 200 and 300, the magnetic flux from one of the first and second inductors 200 and 300 may be transmitted to the other inductor via the magnetic flux link member 500. That is, as illustrated in FIG. 7, the magnetic flux link member 500 may serve as a path of magnetic flux between the first and second inductors 200 and 300, thereby circulating magnetic flux inside the superconducting synchronous motor. Simulation results of the circulation of magnetic flux by the magnetic flux link member are as illustrated in FIG. 9.

If the magnetic flux link member 500 is not provided, magnetic reluctance that may be caused by the disconnectedness between the first and second inductors 200 and 300 may increase, and as a result, the magnitude of a magnetic field generated between a stator 400 and an inductor assembly consisting of the first and second inductors 200 and 300 may decrease. Accordingly, the efficiency of the superconducting synchronous motor may be lowered.

In an exemplary embodiment, the magnetic flux link member 500 may be a cylindrical iron core, as illustrated in FIG. 8. In this exemplary embodiment, one of the top and bottom surfaces of the cylinder may contact a rotation core 210 of the first inductor 200, and the other surface of the cylinder may contact a rotation core 310 of the second inductor 300. In another exemplary embodiment, for an efficient use of the space in the superconducting synchronous motor, the magnetic flux link member 500 may be formed on the outside of the stator 400, which surrounds hooked magnetic poles 220 and 320 of the first and second inductors 200 and 300, to surround the stator 400 and the first and second inductors 200 and 300.

As illustrated in FIG. 7, the superconducting synchronous motor, like its counterpart of FIG. 3, may also include an exciter 40, the stator 400 in which an armature winding is formed, and a stator yoke 31, a damper 320 and a housing 33.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

INDUSTRIAL APPLICABILITY

According to exemplary embodiments of the invention, since superconducting field windings are not rotated during the rotation of a superconducting synchronous motor, it is possible to simplify the structures of an exciter for supplying a current to the superconducting field windings and a cooler for maintaining the superconducting field windings at cryogenic temperature. Also, since the superconducting field windings are located on the outside of an inductor assembly, it is possible to facilitate the design of wiring from an exciter to the superconducting field windings.

What is claimed is:

1. A superconducting synchronous motor, comprising:
   a rotary shaft;
   first and second inductors, each of the first and second inductors including a rotation core mounted at the rotary shaft so as to be rotatable along with the rotary shaft and a hooked magnetic pole extended from a first end of the rotation core in a longitudinal direction, wherein the first and second inductors are formed of a magnetic material and are coupled to each other in such a manner that the hooked magnetic poles of the first and second inductors are alternately engaged with each other;
   first and second superconducting field windings configured to be formed of superconducting wires and to be installed, and fixed, near second ends of the rotation cores of the first and second inductors, respectively,
   wherein the first and second superconducting field windings excite the first and second inductors, respectively, to different poles; and
   a magnetic flux link member configured to be formed of a magnetic material, to surround the first and second superconducting field windings and the first and second inductors, and to transmit magnetic flux between the first and second inductors by being connected to the first inductor on one side thereof and being connected to the second inductor on the other side thereof.

2. The superconducting synchronous motor of claim 1, wherein the magnetic flux link member is a cylindrical iron core, one of top and bottom surfaces of the cylindrical iron core contacts the rotation core of the first inductor and the other surface of the cylindrical iron core contacts the rotation core of the second inductor.

3. The superconducting synchronous motor of claim 1, wherein the hooked magnetic poles of the first and second inductors includes three-pronged forks, respectively, and the three-pronged forks protrude from the rotation cores of the first and second inductors, respectively, in a radial direction and extend in the longitudinal direction to have a predetermined cross-sectional shape.

4. The superconducting synchronous motor of claim 1, further comprising:
   a plurality of coolant tubs configured to contain a cryogenic coolant therein, to surround the first and second superconducting field windings, and to be connected to a cooler.

5. The superconducting synchronous motor of claim 1, further comprising:
   a stator configured to surround the hooked magnetic poles of the first and second inductors and to be formed of a magnetic material that can be excited by an armature winding,
   wherein the stator includes a plurality of consecutive slot grooves, which are formed on the inside of the stator along the longitudinal direction.

* * * * *